(12) United States Patent
Lin

(10) Patent No.: US 8,422,666 B2
(45) Date of Patent: Apr. 16, 2013

(54) WALL MOUNT TELEPHONE AND WALL MOUNT TELEPHONE ASSEMBLY

(75) Inventor: Zai-You Lin, Taipei (TW)

(73) Assignee: Yomore Technology Co., Ltd., Kaohsiung (TW)

( * ) Notice: Subject to any disclaimer, the term of this patent is extended or adjusted under 35 U.S.C. 154(b) by 84 days.

(21) Appl. No.: 13/195,112

(22) Filed: Aug. 1, 2011

(65) Prior Publication Data

US 2012/0237019 A1  Sep. 20, 2012

(30) Foreign Application Priority Data

Mar. 17, 2011  (TW) .............................. 100204764 U

(51) Int. Cl.
*H04M 1/00* (2006.01)
*H04M 9/00* (2006.01)

(52) U.S. Cl.
USPC ........................... 379/435; 379/441; 379/446

(58) Field of Classification Search ............. 379/428.01, 379/435, 441, 446, 447, 453, 455; 455/575.1
See application file for complete search history.

(56) References Cited

U.S. PATENT DOCUMENTS

| | | | | |
|---|---|---|---|---|
| 5,539,821 A * | 7/1996 | Blonder | ........................ | 379/446 |
| 2002/0044646 A1* | 4/2002 | Keenum et al. | ............... | 379/435 |
| 2004/0136524 A1* | 7/2004 | Bliss | ............................ | 379/435 |

* cited by examiner

*Primary Examiner* — Tuan D Nguyen
(74) *Attorney, Agent, or Firm* — Rosenberg, Klein & Lee

(57) ABSTRACT

A wall mount telephone is for use with a socket panel that includes at least one socket receptacle selected from a power socket and a telephone socket. The wall mount telephone includes a base and a handset device. The base includes a mounting wall having a back side provided with a plug that is adapted for direct removable connection with the socket receptacle. The plug is one of a power plug and a telephone plug. The handset device is removably disposed on the base and includes a circuit board that is electrically coupled to the plug to receive a signal from the socket receptacle via the plug when the plug is connected to the socket receptacle.

18 Claims, 5 Drawing Sheets

WALL MOUNT TELEPHONE AND WALL MOUNT TELEPHONE ASSEMBLY

CROSS-REFERENCE TO RELATED APPLICATION

This application claims priority of Taiwanese Application No. 100204764 filed on Mar. 17, 2011.

BACKGROUND OF THE INVENTION

1. Field of the Invention

The present invention relates to a telephone, more particularly to a wall mount telephone.

2. Description of the Related Art

Referring to FIG. 1, a conventional wall mount telephone 1 has a telephone cord 11 and a power line 12, and is electrically connected to a socket panel 10. The socket panel 10 is for mounting on the wall, and includes a power socket and a telephone socket electrically coupled to the power line 12 and the telephone cord 11, respectively. The conventional wall mount telephone 1 further includes a transformer 13 that is electrically coupled between the power line 12 and the power socket and that serves to transfer electric power received from the power socket to the conventional wall mount telephone 1. The telephone cord is for transceiving telephone signals from the telephone socket.

However, an additional drilling process on the wall is required when mounting the conventional telephone on the wall, which results in inconvenience. Furthermore, the telephone cord 11, the power line 12 and the transformer 13 are visible from the outside of the conventional wall mount telephone 1, thus affecting adversely the visual aesthetic quality of a wall on which the conventional wall mount telephone 1 is mounted.

SUMMARY OF THE INVENTION

Therefore, the object of the present invention is to provide a wall mount telephone for use with a socket panel and capable of alleviating the above drawbacks of the prior art. Another object of the present invention is to provide a wall mount telephone assembly.

Accordingly to an aspect of the present invention, there is provided a wall mount telephone for use with a socket panel. The socket panel includes at least one socket receptacle selected from a power socket and a telephone socket. The wall mount telephone comprises a base and a handset device. The base includes a mounting wall having a back side provided with a plug that is adapted for direct removable connection with the socket receptacle. The plug is one of a power plug and a telephone plug. The handset device is removably disposed on the base and includes a circuit board that is electrically coupled to the plug to receive a signal from the socket receptacle via the plug when the plug is connected to the socket receptacle.

According to another aspect of the present invention, there is provided a wall mount telephone assembly for installation on a wall. The wall mount telephone assembly comprises a socket panel and a wall mount telephone. The socket panel includes a power socket and a telephone socket and is adapted for mounting on the wall. The wall mount telephone includes a base and a handset device. The base includes a mounting wall having a back side provided with a power plug and a telephone plug connected directly, electrically, removably, and respectively to the power socket and the telephone socket. The handset device is removably disposed on the base, and includes a circuit board that is electrically coupled to the power plug and the telephone plug to receive electric power and telephone signals, respectively, when the power plug and the telephone plug are connected to the power socket and telephone socket, respectively. The power plug and the telephone plug cooperate with the socket panel to support the wall mount telephone on the wall on which the socket panel is mounted.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
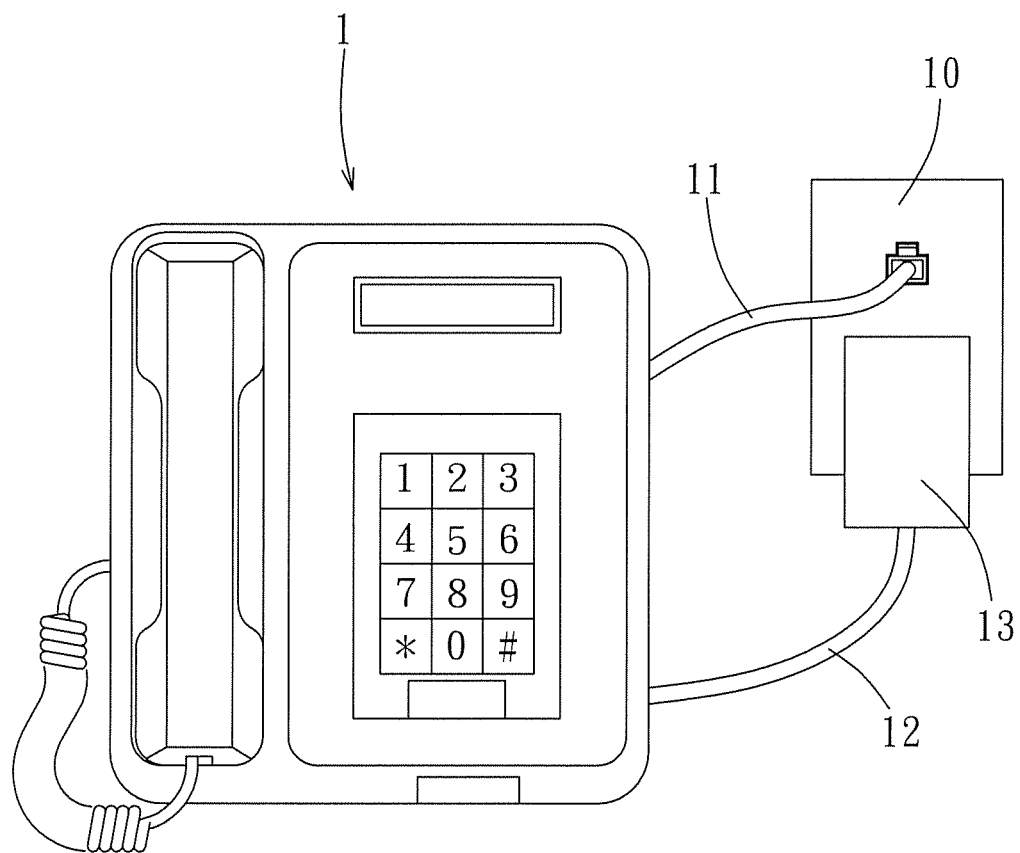
FIG. 1 is a schematic front view of a conventional telephone.
Figure 2:
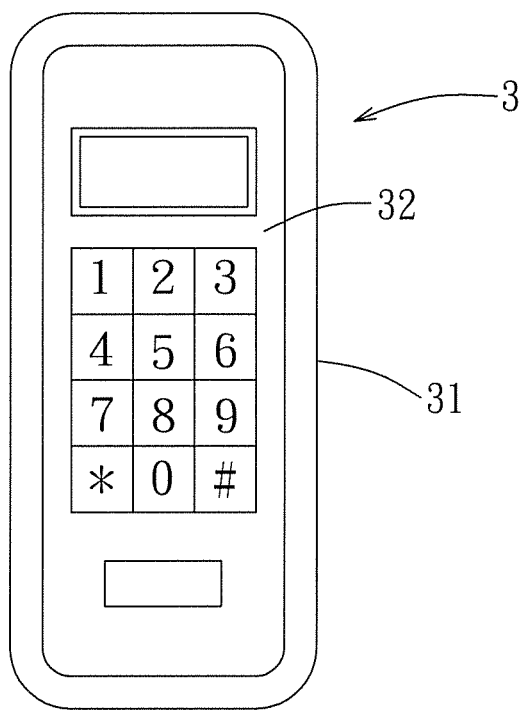
FIG. 2 is a front view of a handset device of a wall mount telephone of a preferred embodiment according to the present invention.

Referring to FIGS. 2 to 5, a preferred embodiment of a wall mount telephone assembly according to the present invention is shown for installation on a wall. The wall mount telephone assembly comprises a socket panel 4 and a wall mount telephone.

The socket panel 4 is for mounting on the wall and includes a telephone socket 41 and a power socket 42. The wall mount telephone includes a base 2 and a handset device 3 removably disposed on the base 2. Since the feature of this invention does not reside in disposition of the telephone socket 41 and the power socket 42 on the socket panel 4, further details of the same are omitted herein for the sake of brevity.

The base 2 includes a main body 28, and a mounting wall 20 having a back side 211 provided with a power plug 22 and a telephone plug 23 connected directly, electrically, removably, and respectively to the power socket 42 and the telephone socket 41. The back side 211 is formed with first and second receiving recesses 24, 25 for accommodating the power plug 22 and the telephone plug 23, respectively. The power plug 22 and the telephone plug 23 cooperate with the socket panel 4 to support the wall mount telephone on the wall on which the socket panel 4 is mounted.

The power plug 22 has a pivot end 221 and a free end 222 opposite to the pivot end 221. The mounting wall 20 is provided with a pivot pin 201 for coupling the pivot end 221 of the power plug 22 pivotally to the back side 211 of the mounting wall 20. The power plug 22 is operable to pivot relative to the back side 211 to dispose the free end 222 of the power plug 22 between connecting and disconnecting positions (see FIGS. 5 and 3), where the power plug 22 is able to connect with and is disconnected from the power socket 42, respectively.

Figure 6:
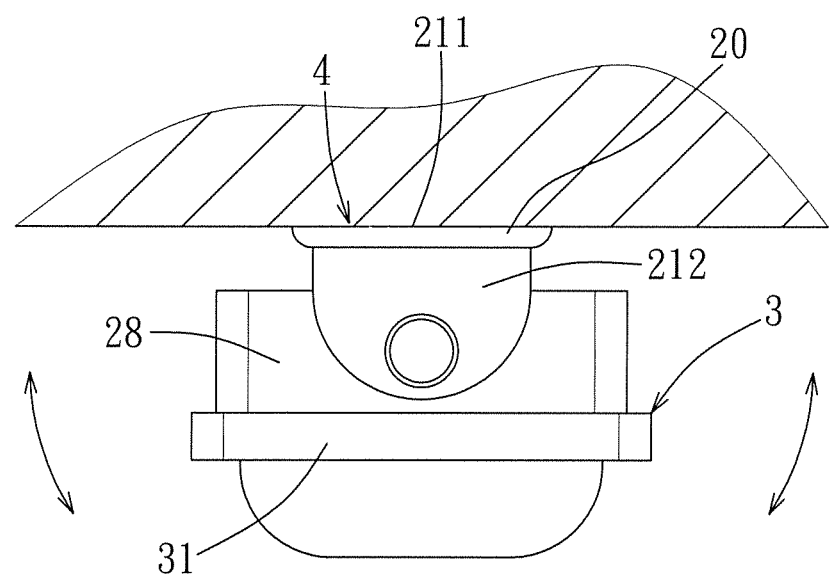
FIG. 6 is a top view of the preferred embodiment.

Further referring to FIG. 6, the mounting wall 20 further has a pair of parallel edges and a pair of clamping arms 212 that protrude respectively from the parallel edges of the mounting wall 20 in a front-rear direction opposite to the back side 211, and that rotatably clamp the main body 28 therebetween such that the main body 28 is rotatable about an axis that is transverse to the front-rear direction.

Figure 3:
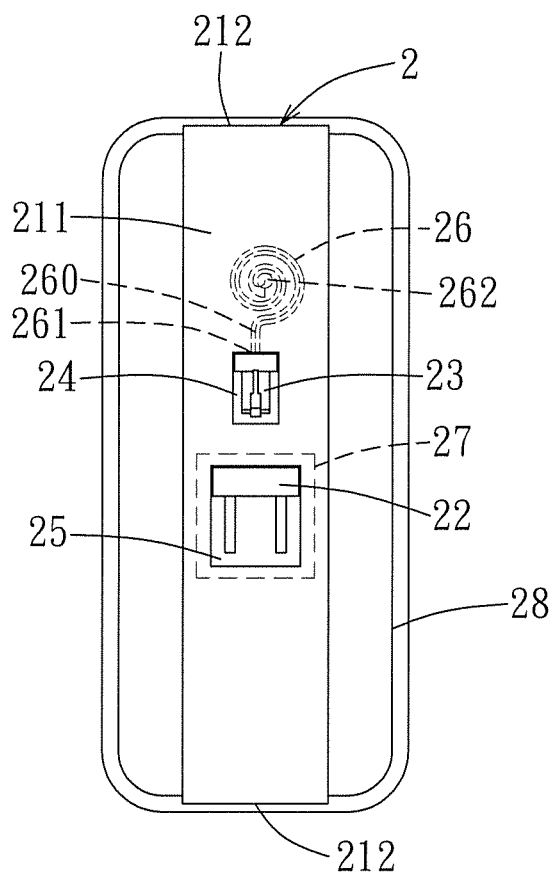
FIG. 3 is a rear view of a base of the preferred embodiment.
Figure 4:
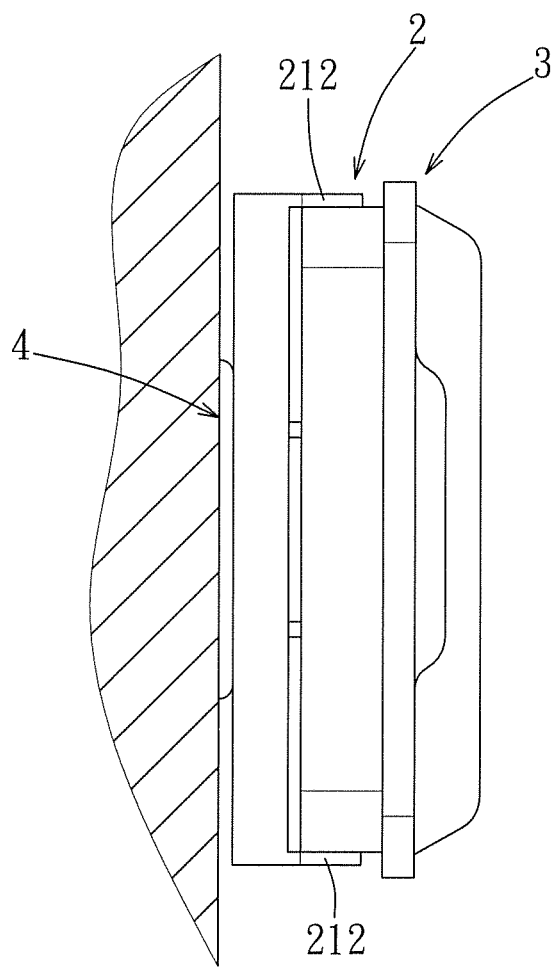
FIG. 4 is a side view of the preferred embodiment mounted on a wall.
Figure 5:
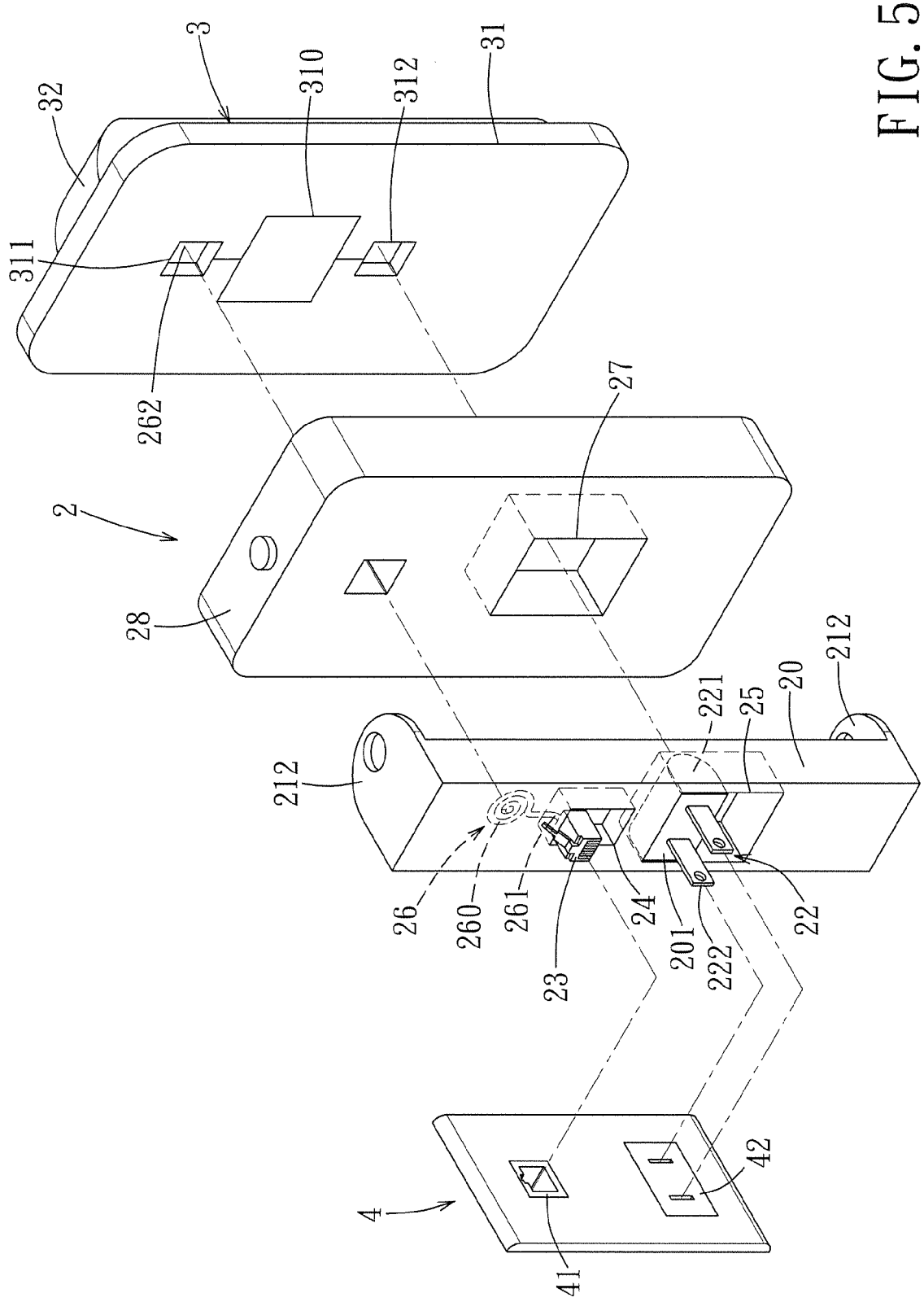
FIG. 5 is an exploded perspective view of the preferred embodiment.

As shown in FIGS. 3 and 5, the base 2 further includes a winding reel 26 that is rotatably disposed in the base 2 and a telephone cord 260 that is wound on the winding reel 26, that is operable between wound and unwound states, and that is biased to the wound state by the winding reel 26. The telephone cord 260 has opposite first and second cord ends 261, 262. The first cord end 261 extends outwardly of the back side 211 of the mounting wall 20 of the base 2, is electrically connected to the telephone plug 23, and is biased by the winding reel 26 to pull the telephone plug 23 toward the second receiving recess 25. The second cord end 262 is electrically coupled to the handset device 3 so as to transceive telephone signals from the telephone socket 41 when the telephone plug 23 is connected to the telephone socket 41.

The base 2 further include a transformer 27 which is disposed in the main body 28, which is electrically coupled between the power plug 22 and the handset device 3, and which serves to transfer electric power received by the power plug 22 to the handset device 3 when the power plug 22 is connected to the power socket 42.

When it is desired to install the wall mount telephone to the socket panel 4, the telephone plug 23 is first pulled outwardly of the first recess 24 from the backside 211 to connect to the telephone socket 41, and the free end 222 of the power plug 22 is then disposed at the connecting position (see FIG. 5) so as to connect with the power socket 42. It should be noted that the first cord end 261 is biased by the winding reel 26 to pull the base 2 toward the socket panel 4 after the telephone plug 23 is connected to the telephone socket 41, thus enhancing connection strength therebetween.

The handset device 3 includes a cradle 31, a circuit board 310, and a handset unit 32. The handset unit 32 is removably disposed on the cradle 31. The circuit board 310 is disposed in the cradle 31 and is electrically coupled to the power plug 22 and the telephone plug 23 to receive the electric power and the telephone signals, respectively, when the power plug 22 and the telephone plug 23 are connected to the power socket 42 and the telephone socket 41, respectively.

The cradle 31 is connected to the main body 28 and is co-rotatable therewith, such that the wall mount telephone can be rotated relative to the wall as desired. The cradle 31 has a first coupling terminal 311 disposed therein and electrically connecting the second cord end 262 of the telephone cord 260 to the circuit board 310, and a second coupling terminal 312 disposed therein and electrically connected to the transformer 27 and the circuit board 310.

To sum up, the advantage of the wall mount telephone assembly according to the present invention is as follows. In the present invention, the power plug 22 and the telephone plug 23 cooperate with the socket panel 4 to support the wall mount telephone on the wall. Compared to the conventional wall mount telephone, an additional drilling process on the wall is not required when installing the wall mount telephone on the wall. Further, the telephone cord 260 and the transformer 27 are accommodated in the base 2, thereby improving the visual aesthetic quality of a wall mounted with the wall mount telephone assembly of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A wall mount telephone for use with a socket panel, the socket panel including at least one socket receptacle selected from a power socket and a telephone socket, said wall mount telephone comprising:

a base including a mounting wall having a back side provided with a plug that is adapted for direct removable connection with the socket receptacle, said plug being one of a power plug and a telephone plug; and a handset device removably disposed on said base and including a circuit board that is electrically coupled to said plug to receive a signal from the socket receptacle via said plug when said plug is connected to the socket receptacle.

2. The wall mount telephone as claimed in claim 1, the socket receptacle being a power socket, wherein said plug is a power plug having a pivot end and a free end opposite to said pivot end, said mounting wall being provided with a pivot pin for coupling said pivot end of said power plug pivotally to said back side of said mounting wall, said power plug being operable to pivot relative to said back side to dispose said free end of said power plug between connecting and disconnecting positions, where said power plug is able to connect with and is disconnected from the power socket, respectively.

3. The wall mount telephone as claimed in claim 2, wherein said back side of said mounting wall is formed with a receiving recess for accommodating said power plug when said free end of said power plug is disposed at the disconnecting position.

4. The wall mount telephone as claimed in claim 1, wherein said back side of said mounting wall is formed with a receiving recess for accommodating said plug.

5. The wall mount telephone as claimed in claim 4, the socket receptacle being a telephone socket, wherein said plug is a telephone plug, said base further including:

a winding reel that is rotatably disposed in said base; and a telephone cord that is wound on said winding reel, that is operable between wound and unwound states, and that is biased to the wound state by said winding reel;

said telephone cord having opposite first and second cord ends, said first cord end extending outwardly of said back side of said mounting wall of said base, being electrically connected to said telephone plug, and being biased by said winding reel to pull said telephone plug toward said receiving recess, said second cord end being electrically coupled to said circuit board of said handset device so as to transceive the signal from the telephone socket when said telephone plug is connected to the telephone socket.

6. The wall mount telephone as claimed in claim 5, wherein said handset device further includes:

a cradle in which said circuit board is disposed, and having a coupling terminal disposed on said cradle and electrically connecting said second cord end of said telephone cord to said circuit board; and a handset unit removably disposed on said cradle.

7. The wall mount telephone as claimed in claim 1, the socket receptacle being a power socket, wherein said plug is a power plug, and said base further includes a transformer that is electrically coupled between said power plug and said circuit board of said handset device and that serves to transfer the electric power received by said power plug to said circuit board when said power plug is connected to the power socket.

8. The wall mount telephone as claimed in claim 7, wherein said handset device further includes:
- a cradle in which said circuit board is disposed, and having a coupling terminal disposed on said cradle and electrically connected to said transformer of said base and said circuit board.

9. The wall mount telephone as claimed in claim 8, wherein said base further includes a main body having said transformer disposed therein, said cradle being connected to said main body, said mounting wall further having a pair of parallel edges and a pair of clamping arms that protrude respectively from said parallel edges of said mounting wall in a front-rear direction opposite to said back side, and that rotatably clamp said main body therebetween such that said main body is rotatable about an axis that is transverse to the front-rear direction.

10. The wall mount telephone as claimed in claim 1, the socket panel including two of the socket receptacles, one of which is a power socket, the other one of which is a telephone socket, wherein said back side of said mounting wall is provided with two of said plugs, one of said plugs being a power plug for connection with the power socket, the other of said plugs being a telephone plug for connection with the telephone socket.

11. A wall mount telephone assembly for installation on a wall, comprising:
- a socket panel including a power socket and a telephone socket, said socket panel being adapted for mounting on the wall; and
- a wall mount telephone including
  - a base including a mounting wall having a back side provided with a power plug and a telephone plug connected directly, electrically, removably, and respectively to said power socket and said telephone socket; and
  - a handset device removably disposed on said base, and including a circuit board that is electrically coupled to said power plug and said telephone plug to receive electric power and telephone signals, respectively, when said power plug and said telephone plug are connected to said power socket and telephone socket, respectively;
- wherein said power plug and said telephone plug cooperate with said socket panel to support said wall mount telephone on the wall on which said socket panel is mounted.

12. The wall mount telephone assembly as claimed in claim 11, wherein said power plug has a pivot end and a free end opposite to said pivot end, said mounting wall being provided with a pivot pin for coupling said pivot end of said power plug pivotally to said back side of said mounting wall, said power plug being operable to pivot relative to said backside to dispose said free end of said power plug between connecting and disconnecting positions, where said power plug is able to connect with and is disconnected from the power socket, respectively.

13. The wall mount telephone assembly as claimed in claim 12, wherein said back side of said mounting wall is formed with first and second receiving recesses for accommodating said power plug and said telephone plug, respectively.

14. The wall mount telephone assembly as claimed in claim 13, wherein said base further includes:
- a winding reel that is rotatably disposed in said base; and
- a telephone cord that is wound on said winding reel, that is operable between wound and unwound states, and that is biased to the wound state by said winding reel;
- said telephone cord having opposite first and second cord ends, said first cord end extending outwardly of said back side of said mounting wall of said base, being electrically connected to said telephone plug, and being biased by said winding reel to pull said telephone plug toward said second receiving recess, said second cord end being electrically coupled to said circuit board of said handset device so as to transceive the telephone signals from said telephone socket when said telephone plug is connected to said telephone socket.

15. The wall mount telephone assembly as claimed in claim 14, wherein said handset device further includes:
- a cradle in which said circuit board is disposed, and having a coupling terminal disposed on said cradle and electrically connecting said second cord end of said telephone cord to said circuit board; and
- a handset unit removably disposed on said cradle.

16. The wall mount telephone assembly as claimed in claim 11, wherein said base further includes a transformer that is electrically coupled between said power plug and said circuit board of said handset device and that serves to transfer the electric power received by said power plug to said circuit board when said power plug is connected to said power socket.

17. The wall mount telephone assembly as claimed in claim 16, wherein said handset device further includes:
- a cradle in which said circuit board is disposed, and having a coupling terminal disposed on said cradle and electrically connected to said transformer of said base and said circuit board.

18. The wall mount telephone assembly as claimed in claim 17, wherein said base further includes a main body having said transformer disposed therein, said cradle being connected to said main body, said mounting wall further having a pair of parallel edges and a pair of clamping arms that protrude respectively from said parallel edges of said mounting wall in a front-rear direction opposite to said back side, and that rotatably clamp said main body therebetween such that said main body is rotatable about an axis that is transverse to the front-rear direction.

* * * * *